(12) United States Patent
Brown et al.

(10) Patent No.: US 7,146,573 B2
(45) Date of Patent: Dec. 5, 2006

(54) AUTOMATIC WINDOW REPRESENTATION ADJUSTMENT

(75) Inventors: Michael Wayne Brown, Georgetown, TX (US); Andrew Douglas Hately, Austin, TX (US); Kelvin Roderick Lawrence, Round Rock, TX (US); Michael A. Paolini, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 10/058,772

(22) Filed: Jan. 28, 2002

(65) Prior Publication Data

US 2003/0142139 A1 Jul. 31, 2003

(51) Int. Cl.
*G06F 3/00* (2006.01)
(52) U.S. Cl. .............. 715/802; 715/783; 715/788; 715/781; 715/768
(58) Field of Classification Search ........... 345/788, 345/794, 795, 797, 790; 715/795, 778, 779, 715/781, 794, 783, 797, 802, 788, 768
See application file for complete search history.

(56) References Cited

U.S. PATENT DOCUMENTS

| 5,179,655 A | 1/1993 | Noguchi et al. |
| 5,303,388 A | 4/1994 | Kreitman et al. |
| 5,313,230 A | 5/1994 | Venolia et al. |
| 5,333,256 A | 7/1994 | Green et al. |

(Continued)

FOREIGN PATENT DOCUMENTS

EP 0684542 A1 11/1995

(Continued)

OTHER PUBLICATIONS

Microsoft® Windows, Version 4.0, copyright 1998 (Screenshots 1-5).*

(Continued)

*Primary Examiner*—Kieu D. Vu
*Assistant Examiner*—Ting Zhou
(74) *Attorney, Agent, or Firm*—Marilyn S. Dawkins; Amy J. Pattillo

(57) ABSTRACT

A method, system, and program for automatically adjusting window representations based on activity are provided. Current activity of a window element displayed within a graphical interface is detected. A representation of the window element is automatically adjusted within the display area to reflect current activity of the window element, such that the representation of the window element is graphically represented. In particular, the window element representation may include a minimized icon or an open window. Further, window element activity may include use of the window element, adjustments to the transparency of the window element representation or current resource usage associated with the window element.

21 Claims, 5 Drawing Sheets

U.S. PATENT DOCUMENTS

| | | | |
|---|---|---|---|
| 5,377,317 A | | 12/1994 | Bates et al. |
| 5,390,295 A | | 2/1995 | Bates et al. |
| 5,461,399 A | | 10/1995 | Cragun |
| 5,463,775 A | | 10/1995 | DeWitt et al. |
| 5,479,598 A | | 12/1995 | Feitelson et al. |
| 5,499,334 A | * | 3/1996 | Staab ......................... 345/778 |
| 5,533,182 A | | 7/1996 | Bates et al. |
| 5,550,969 A | | 8/1996 | Torres et al. |
| 5,555,354 A | | 9/1996 | Strasnick et al. |
| 5,572,672 A | | 11/1996 | Dewitt et al. |
| 5,590,264 A | | 12/1996 | Keane et al. |
| 5,590,265 A | | 12/1996 | Nakazawa |
| 5,640,498 A | * | 6/1997 | Chew ......................... 345/790 |
| 5,651,107 A | | 7/1997 | Frank et al. |
| 5,694,561 A | * | 12/1997 | Malamud et al. ........... 345/805 |
| 5,701,400 A | | 12/1997 | Amado |
| 5,764,229 A | | 6/1998 | Bennett |
| 5,805,163 A | | 9/1998 | Bagnas |
| 5,805,166 A | | 9/1998 | Hall et al. |
| 5,812,688 A | | 9/1998 | Gibson |
| 5,852,440 A | | 12/1998 | Grossman et al. |
| 5,889,530 A | | 3/1999 | Findlay |
| 5,892,511 A | * | 4/1999 | Gelsinger et al. ........... 345/794 |
| 5,898,433 A | | 4/1999 | Hijikata |
| 5,923,326 A | | 7/1999 | Bittinger et al. |
| 5,936,612 A | | 8/1999 | Wang |
| 5,977,972 A | | 11/1999 | Bates et al. |
| 5,982,369 A | | 11/1999 | Sciammarella et al. |
| 5,999,178 A | | 12/1999 | Hwang et al. |
| 6,002,397 A | | 12/1999 | Jaaskelainen, Jr. |
| 6,025,841 A | | 2/2000 | Finkelstein et al. |
| 6,040,831 A | | 3/2000 | Nishida |
| 6,049,798 A | | 4/2000 | Bishop et al. |
| 6,064,974 A | | 5/2000 | Broekhuijsen |
| 6,081,266 A | | 6/2000 | Sciammarella |
| 6,097,371 A | | 8/2000 | Siddiqui et al. |
| 6,108,003 A | * | 8/2000 | Hall et al. ................... 715/772 |
| 6,111,614 A | * | 8/2000 | Mugura et al. ............. 348/569 |
| 6,201,539 B1 | | 3/2001 | Miller et al. |
| 6,295,062 B1 | | 9/2001 | Tada et al. |
| 6,297,818 B1 | | 10/2001 | Ulrich et al. |
| 6,342,908 B1 | | 1/2002 | Bates et al. |
| 6,344,863 B1 | | 2/2002 | Capelli et al. |
| 6,392,640 B1 | | 5/2002 | Will |
| 6,396,482 B1 | | 5/2002 | Griffin et al. |
| 6,429,883 B1 | | 8/2002 | Plow et al. |
| 6,462,757 B1 | * | 10/2002 | Kao et al. ................... 345/783 |
| 6,473,102 B1 | | 10/2002 | Rodden et al. |
| 6,476,796 B1 | | 11/2002 | Kuzunuki et al. |
| 6,489,950 B1 | | 12/2002 | Griffin et al. |
| 6,493,002 B1 | | 12/2002 | Christensen |
| 6,512,529 B1 | | 1/2003 | Janssen et al. |
| 6,523,079 B1 | | 2/2003 | Kikinis et al. |
| 6,532,005 B1 | | 3/2003 | Campbell |
| 6,542,165 B1 | | 4/2003 | Ohkado |
| 6,549,218 B1 | | 4/2003 | Gershony et al. |
| 6,567,812 B1 | | 5/2003 | Garrecht et al. |
| 6,573,915 B1 | * | 6/2003 | Sivan et al. ................ 345/781 |
| 6,587,128 B1 | | 7/2003 | Kanevsky et al. |
| 6,618,170 B1 | | 9/2003 | Whiting et al. |
| 6,630,943 B1 | | 10/2003 | Nason et al. |
| 6,633,310 B1 | | 10/2003 | Andrew et al. |
| 6,670,970 B1 | | 12/2003 | Bonura et al. |
| 6,720,982 B1 | | 4/2004 | Sakaguchi |
| 6,741,266 B1 | | 5/2004 | Kamiwada et al. |
| 2001/0030667 A1 | | 10/2001 | Kelts |
| 2001/0055017 A1 | | 12/2001 | Ording |
| 2002/0052685 A1 | | 5/2002 | Kamiya et al. |
| 2002/0054117 A1 | | 5/2002 | Van Dantzich et al. |
| 2002/0078456 A1 | | 6/2002 | Hudson et al. |
| 2002/0140725 A1 | | 10/2002 | Horii |
| 2003/0142108 A1 | | 7/2003 | Brown et al. |
| 2003/0142109 A1 | | 7/2003 | Brown et al. |
| 2003/0142132 A1 | | 7/2003 | Brown et al. |
| 2003/0142133 A1 | | 7/2003 | Brown et al. |
| 2003/0142137 A1 | | 7/2003 | Brown et al. |
| 2003/0142138 A1 | | 7/2003 | Brown et al. |
| 2003/0142140 A1 | | 7/2003 | Brown et al. |
| 2003/0142141 A1 | | 7/2003 | Brown et al. |
| 2003/0142143 A1 | | 7/2003 | Brown et al. |
| 2003/0142148 A1 | | 7/2003 | Brown et al. |
| 2003/0142149 A1 | | 7/2003 | Brown et al. |

FOREIGN PATENT DOCUMENTS

EP          1083485 A2 * 3/2001

OTHER PUBLICATIONS

Microsoft® Windows, copyright 1998 (screenshots attached).*
IBM Technical Disclosure Bulletin, "Translucent Windows: Dragging an Image without Obscuring the Desktop:", vol. 37, No. 10, Oct. 1994, p. 15.
IBM Technical Disclosure Bulletin, "Independent Pixel Interpretation of Windowed Overlays/Underlays", vol. 38, No. 09, Sep. 1995, pp. 365-367.
IBM Research Disclosure 431180, "Progressively animated graphical overlays", Mar. 2000, p. 592.
Displaying Specified Resource Usage.
Displaying Transparent Resource Aids.
Selectively Adjusting Transparency of Windows Within a User Interface.
Changing the Alpha Levels of an Application Window to Indicate a Status of a Computing Task.
Adjusting the Tint of a Translucent Window to Convey Status.
Adjusting Transparency of Windows to Reflect Recent Use.
Displaying Transparency Characteristic Aids.
Specifying Audio Output According to Window Graphical Characteristics.
Varying Heights of Application Images to Convey Application Status.
Selectively Adjusting the Translucency of Windows in Response to a Scroll Wheel Rotation.
Selectively Adjusting the Order of Windows in Response to a Scroll Wheel Rotation.
Make the Language Bar Transparent, 1 page, wysiwyg://fraContent.fraRightFrame.50/ht . . . olbar_change_transparency.asp?frame=true.
TUCOWS Shell Enhancements Trans-XP, 2 pages, wysiwyg://20/http://www.tucows.com/system/preview/232626.html.
The Iconfactory: Your Quality Freeware Icons Hub (ibxp_home.asp), 2 pages, http://www.iconfactory.com/ibxp_home.asp.
Tweak_XP, 2 pages, http://www.totalidea.ce/transxp.htm.
Trans-XP Information, Details, and Download from VoodooFiles.com, 1 page, wysiwyg://15/http://www.voodoofiles.com/5817.
Cronosoft, 1 page, wysiwyg://26/http://www.cronosoft.com/download/qhwxp/index.htm.
Windows XP Home Page, 1 page, Wysiwyg://33/http://www.microsoft.com/windowssxp/default.asp.

* cited by examiner

MINIMIZATION/MAXIMIZATION PREFERENCES 70

ACCORDING TO TRANSPARENCY 72

APPLICATION WINDOW — MINIMIZE WHEN >90% TRANSPARENCY
MAXIMIZE WHEN <70% TRANSPARENCY

BROWSER — MINIMIZE WHEN >80% TRANSPARENCY
MAXIMIZE WHEN <80% TRANSPARENCY

ACCORDING TO RESOURCE USAGE 74

MEMORY
MINIMIZE APPLICATION WITH MOST MEMORY USAGE IF TOTAL MEMORY USAGE >80%

SOUND CARD
MAXIMIZE APPLICATION WITH GREATEST SOUND CARD USAGE IF >50% OF USAGE

ACCORDING TO GENERAL USE 76

LEAST RECENTLY USED
  MINIMIZE THE LEAST RECENTLY USED WINDOW IF THE TOTAL WINDOWS ARE >3, <9
  MINIMIZE THE LAST TWO LEAST RECENTLY USED WINDOWS IF THE TOTAL WINDOWS ARE 9 OR GREATER

MOST RECENTLY USED
  MINIMIZE THE 3RD AND 4TH MOST RECENTLY USED WINDOWS

*FIG. 6*

AUTOMATIC WINDOW REPRESENTATION ADJUSTMENT

CROSS-REFERENCE TO RELATED APPLICATIONS

The present application is related to the following co-pending applications, which are filed on even date herewith and incorporated herein by reference:

(1) U.S. patent application Ser. No. 10/059,093, filed Jan. 28, 2002, abandoned May 18, 2005;

(2) U.S. patent application Ser. No. 10/059,011, filed Jan. 28, 2002;

(3) U.S. patent application Ser. No. 0/059,092, filed Jan. 28, 2002;

(4) U.S. patent application Ser. No. 0/059,088, filed Jan. 28, 2002;

(5) U.S. patent application Ser. No. 0/059,027, filed Jan. 28, 2002;

(6) U.S. patent application Ser. No. 0/058,532, abandoned on Mar. 4, 2005;

(7) U.S. patent application Ser. No. 0/059,086, filed Jan. 28, 2002;

(8) U.S. patent application Ser. No. 0/058,397, abandoned on Mar. 4, 2005;

(9) U.S. patent application Ser. No. 0/058,300, abandoned on Mar. 4, 2005;

(10) U.S. patent application Ser. No. 0/058,493, abandoned on Mar. 4, 2005; and

(11) U.S. patent application Ser. No. 0/058,599, abandoned on Mar. 4, 2005;.

BACKGROUND OF THE INVENTION

1. Technical Field

The present invention relates in general to computer systems and, in particular, to graphical user interfaces. Still more particularly, the present invention relates to automatically adjusting window representations within a graphical user interface based on activity.

2. Description of the Related Art

Most operating systems provide a graphical user interface (GUI) for controlling a visual computer environment. The GUI represents programs, files, and options with graphical images, such as icons, menus, and dialog boxes on the screen. Graphical items defined within the GUI work the same way for the user in most software because the GUI provides standard software routines to handle these elements and report the user's actions.

A typical graphical object defined by a GUI is a window or other defined area of a display containing distinguishable text, graphics, video, audio and other information for output. A display area may contain multiple windows associated with a single software program or multiple software programs executing concurrently.

Often when multiple graphical objects are displayed concurrently, the graphical objects will overlap. The order in which graphical objects are drawn on top of one another onscreen to simulate depth is typically known as the z-order. Typically, those objects at the top of the z-axis obscure the view of those graphical objects drawn below.

A general limitation of z-ordered windows is that as more windows are opened within a display area, windows that are at the bottom of the z-order may not remain visible. A user may select to minimize particular windows into icons or as part of a selectable pop-up list, however performing such actions requires bringing the particular windows first to the top of the z-order.

In some operating systems, a level of transparency or translucency may be applied to graphical objects, and in particular to windows. By applying a level of translucency to upper level windows, lower level windows are rendered visible through the upper level windows. Utilizing translucency is particularly advantageous such that multiple levels of windows within the z-order are visible at the same time.

A particular limitation of applying translucency to windows is that some windows may become so transparent that the window is no longer visible. For example, U.S. patent application Ser. No. 10/059,088 describes adjusting the transparency of a window to reflect the resource usage associated with the window, sometimes leaving a window completely transparent and thus seemingly unavailable to the user.

Therefore, in view of the foregoing, it would be advantageous to provide a method, system, and program, for automatically minimizing windows that have reached a particular level of activity, including use of the window, a transparency applied to the window, and resource usage associated with the window.

SUMMARY OF THE INVENTION

In view of the foregoing, it is therefore an object of the present invention to provide an improved computer system.

It is another object of the present invention to provide an improved graphical user interface.

It is yet another object of the present invention to provide a method, system and program for automatically adjusting window representations based on activity.

According to one aspect of the present invention, current activity of a window element displayed within a graphical interface is detected. A representation of the window element is automatically adjusted within the display area to reflect current activity of the window element, such that the representation of the window element is graphically represented. In particular, the window element representation may include a minimized icon or an open window. Further, window element activity may include use of the window element, adjustments to the transparency of the window element representation or current resource usage associated with the window element.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 6 illustrates a table of minimization and maximization representation preferences in accordance with the method, system, and program of the present invention.

DETAILED DESCRIPTION OF THE PREFERRED EMBODIMENT

Figure 1:
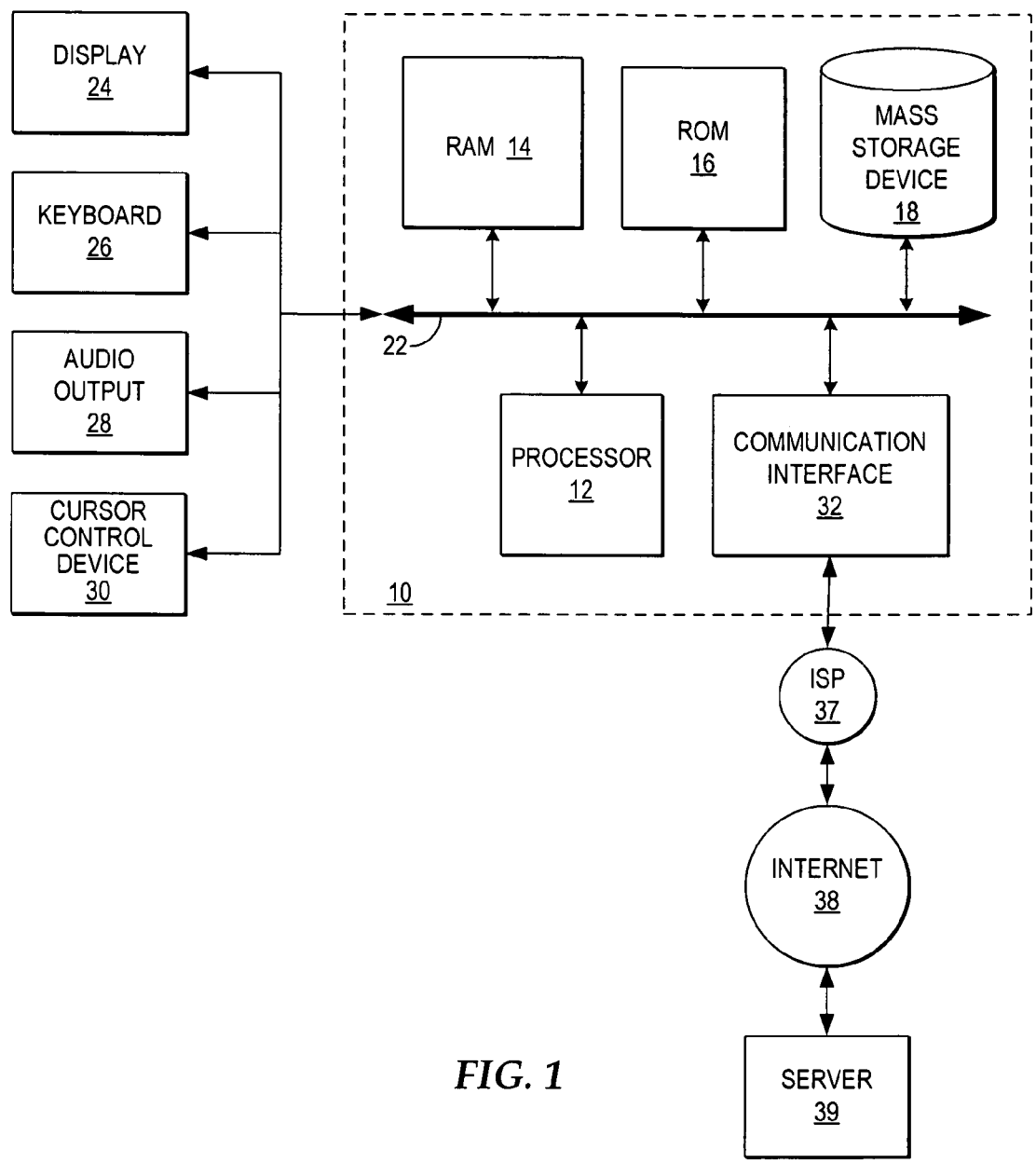
FIG. 1 depicts one embodiment of a computer system with which the method, system and program of the present invention may advantageously be utilized.

A method, system, and program for automatically adjusting window representations based on activity are provided. In addition to windows, the representations of other displayable objects may be adjusted based on activity. Activity may include use of the window element, adjustments to the transparency of the window element representation or current resource usage associated with the window element. In addition, activity may include periods of inactivity.

A "displayable object" may include text, icons, video, graphics, windows, or other logical graphical representations displayable within a display area. Displayable objects may be hidden or visible. Further, displayable objects may be layered in a z-order. Moreover, a displayable object may utilize a portion of a display area or may extend across the entirety of a display area. A displayable object may or may not include definable boundaries.

For purposes of the present invention, a window representation is the current graphical display format of a window element. A window element is preferably the portion of data assigned to a particular window. Multiple applications, each defining at least one window element, may execute concurrently, where the representations of window elements from each of the multiple applications are also displayed concurrently.

A z-order is the order along the z-axis in which displayable objects appear. Through a z-buffering technique, a depth is associated with each displayable object such that each object appears to be set at a particular depth in comparison with other displayable objects. The z-order may be a result of the order in which a user opens displayable objects onto the display. Alternatively, according to one advantage of the present invention, a user may designate for the z-order to be set according to a particular criteria.

Transparency is a graphical feature that is particularly advantageous to the present invention when displaying multiple displayable objects within a user interface where those displayable objects may overlap. As will be understood by one skilled in the art, by making a displayable object appear transparent on a computer screen, other displayable objects positioned below the transparent displayable object are rendered visible through the transparent displayable object. Further, the transparency of a displayable object may be adjusted from opaque to totally transparent.

Typically, the transparency attribute is stored with color values in an alpha channel. Then, when calculating the appearance of a given pixel, the graphic processor uses the alpha channel values to determine the pixel's color through a process termed alpha blending. Through alpha blending, the process adds a fraction of the color of the transparent object set by the alpha channel value to the color of the displayable object below. Mixing the colors together gives the appearance that the displayable object below is seen through a layer of the transparent displayable object. In addition to alpha blending, additional shading may be added to create shadows and other graphical images to cue the viewer to the position of the transparent displayable object.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

Hardware Overview

The present invention may be executed in a variety of systems, including a variety of computing systems and electronic devices under a number of different operating systems. In one embodiment of the present invention, the computer system is a portable computing system such as a notebook computer, a palmtop computer, a personal digital assistant, a telephone or other electronic computing system that may also incorporate communications features that provide for telephony, enhanced telephony, messaging and information services. However, the computer system may also be, for example, a desktop computer, a network computer, a midrange computer, a server system or a mainframe computer. Therefore, in general, the present invention is preferably executed in a computer system that performs computing tasks such as manipulating data in storage that is accessible to the computer system. In addition, the computer system preferably includes at least one output device and at least one input device.

Referring now to the drawings and in particular to FIG. 1, there is depicted one embodiment of a computer system with which the method, system and program of the present invention may advantageously be utilized. Computer system 10 comprises a bus 22 or other communication device for communicating information within computer system 10, and at least one processing device such as processor 12, coupled to bus 22 for processing information. Bus 22 preferably includes low-latency and high-latency paths that are connected by bridges and controlled within computer system 10 by multiple bus controllers.

Processor 12 may be a general-purpose processor such as IBM's PowerPC™ processor that, during normal operation, processes data under the control of operating system and application software stored in a dynamic storage device such as random access memory (RAM) 14 and a static storage device such as Read Only Memory (ROM) 16. The operating system preferably provides a graphical user interface (GUI) to the user. In a preferred embodiment, application software contains machine executable instructions that when executed on processor 12 carry out the operations depicted in the flowcharts of FIG. 7 and others described herein. Alternatively, the steps of the present invention might be performed by specific hardware components that contain hardwire logic for performing the steps, or by any combination of programmed computer components and custom hardware components.

The present invention may be provided as a computer program product, included on a machine-readable medium having stored thereon the machine executable instructions used to program computer system 10 to perform a process according to the present invention. The term "machine-readable medium" as used herein includes any medium that participates in providing instructions to processor 12 or other components of computer system 10 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM), a digital video disc-ROM (DVD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of non-volatile media is storage device 18. Volatile media includes dynamic memory such as RAM 14. Transmission media includes coaxial cables, copper wire or fiber optics, including the wires that comprise bus 22. Transmission media can also take the form of acoustic or light waves, such as those generated during radio wave or infrared data communications.

Moreover, the present invention may be downloaded as a computer program product, wherein the program instructions may be transferred from a remote computer such as a server 39 to requesting computer system 10 by way of data signals embodied in a carrier wave or other propagation medium via a network link 34 (e.g., a modem or network connection) to a communications interface 32 coupled to bus 22. Communications interface 32 provides a two-way data communications coupling to network link 34 that may be connected, for example, to a local area network (LAN), wide area network (WAN), or as depicted herein, directly to an Internet Service Provider (ISP) 37. In particular, network link 34 may provide wired and/or wireless network communications to one or more networks.

ISP 37 in turn provides data communication services through the Internet 38 or other network. Internet 38 may refer to the worldwide collection of networks and gateways that use a particular protocol, such as Transmission Control Protocol (TCP) and Internet Protocol (IP), to communicate with one another. ISP 37 and Internet 38 both use electrical, electromagnetic, or optical signals that carry digital data streams. The signals through the various networks and the signals on network link 34 and through communication interface 32, which carry the digital data to and from computer system 10, are exemplary forms of carrier waves transporting the information.

Further, multiple peripheral components may be added to computer system 10. For example, an audio output 28 is attached to bus 22 for controlling audio output through a speaker or other audio projection device. A display 24 is also attached to bus 22 for providing visual, tactile or other graphical representation formats. Display 24 may include both non-transparent surfaces, such as monitors, and transparent surfaces, such as headset sunglasses or vehicle windshield displays.

A keyboard 26 and cursor control device 30, such as a mouse, trackball, or cursor direction keys, are coupled to bus 22 as interfaces for user inputs to computer system 10. Keyboard 26 and cursor control device 30 can control the position of a cursor positioned within a display area of display 24. It should be understood that keyboard 26 and cursor control device 30 are examples of multiple types of input devices that may be utilized in the present invention. In alternate embodiments of the present invention, additional input and output peripheral components may be added.

Recently Used Translucency Context

Figure 2:
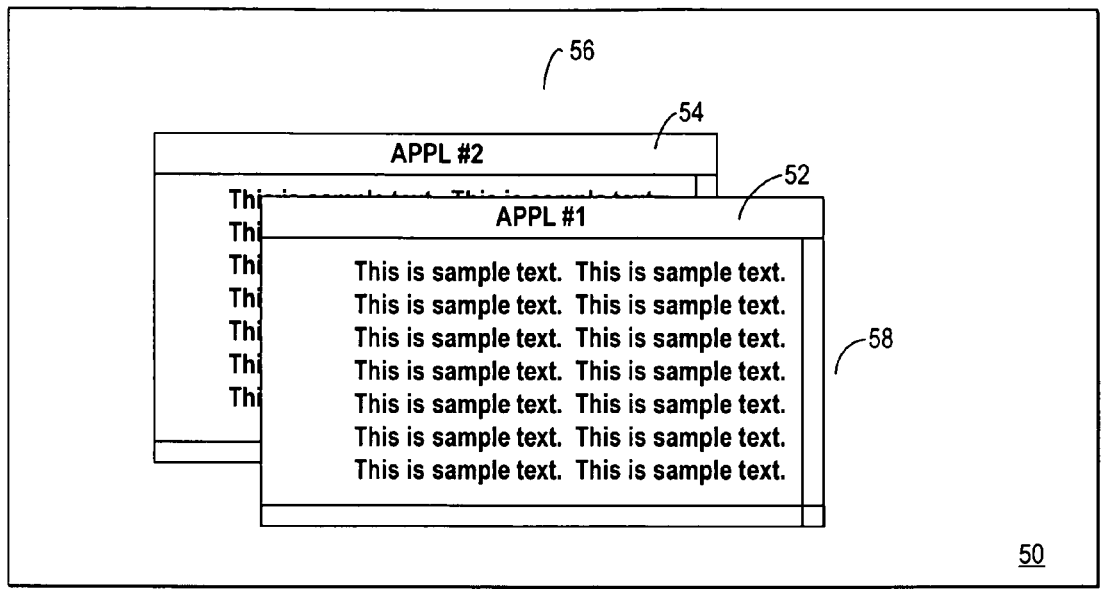
FIG. 2 illustrates a graphical representation of a user interface where windows are ordered according to recent usage in accordance with the method, system, and program of the present invention.

Referring now to FIG. 2, there is depicted a graphical representation of a user interface where windows are ordered according to recent usage in accordance with the method, system, and program of the present invention. As illustrated, a user interface 50 includes windows 52, 54, and 56. In the present example, window 52 is positioned at the top level of the z-order, followed in position by window 54, and then window 56.

In the example, windows 52, 54, and 56 are open representations of window elements because the windows are displayed in an open window format. While in the present embodiment the sizes of the open representations are similar, in alternate embodiments of the present invention, alternate sizes of open representations of window elements may be displayed.

In addition, in the example, windows 52, 54, and 56 are z-ordered according to recent use, where the most recently used window is displayed as the top level of the z-order. While the z-order of windows traditionally reflects the order of recent use, as will be further described, criteria for ordering windows may be adjusted.

A shadow 58 is applied to window 52 in order to distinguish that window 52 is displayed at the top level of the z-order. In alternate embodiments, additional shading may also be added to lower levels windows in order to further graphically distinguish the ordering of windows.

In addition, adding shading to windows is particularly advantageous where transparency is applied to windows. Although not depicted, levels of transparency may be applied to each of windows 52, 54, and 56 to further distinguish the ordering of the windows. For example, window 52 may be displayed at 0% transparency, while window 54 is displayed at 20% transparency and window 56 is displayed at 40% transparency.

Figure 3:
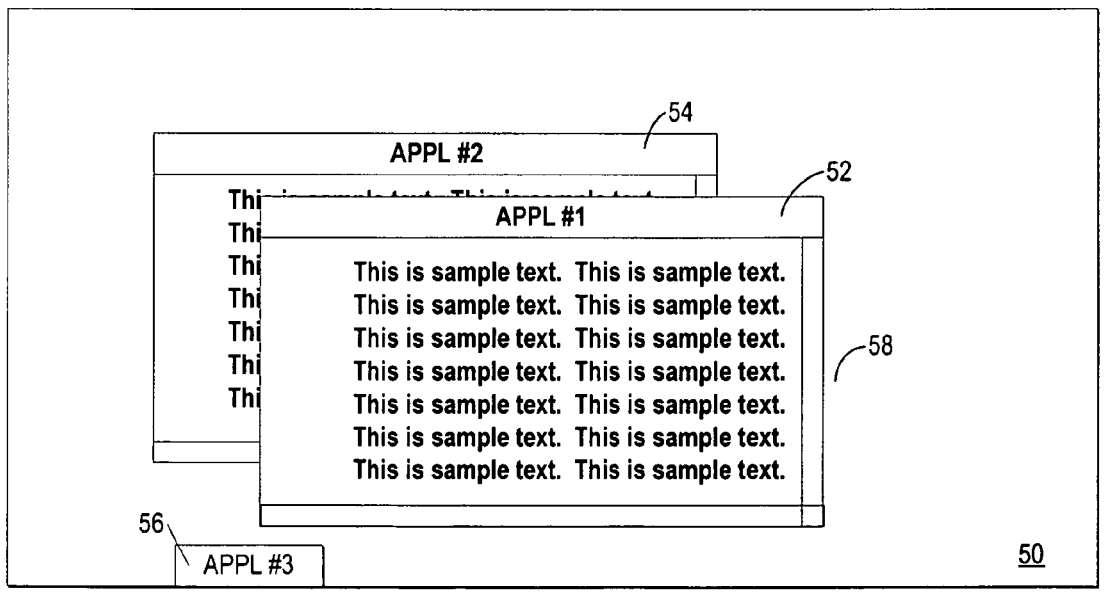
FIG. 3 depicts a graphical representation of a user interface in which representations of windows are adjusted according to recent use in accordance with the method, system, and program of the present invention.

With reference now to FIG. 3, there is illustrated a graphical representation of a user interface in which representations of windows are adjusted according to recent use in accordance with the method, system, and program of the present invention.

As depicted, the window representation of window 56 is minimized. In the example, the minimized window representation of window 56 graphical represents that window 56 is the least recently used window. When determining recent use, the use of windows with representations that are both open and minimized is preferably compared.

In particular, where transparency is applied to window representations in addition to or as an alternative to ordering, the least recently window representation may become so transparent that visibility is limited. In that case, it is advantageous to automatically minimize the least recently used window representation to an icon or pop-up list, such that the screen space utilized to depict the least recently used window representation is minimized and the least recently used window representation is visible. Where multiple window representations are minimized, the minimized window representations are preferably further ordered to indicate recent usage.

Figure 4:
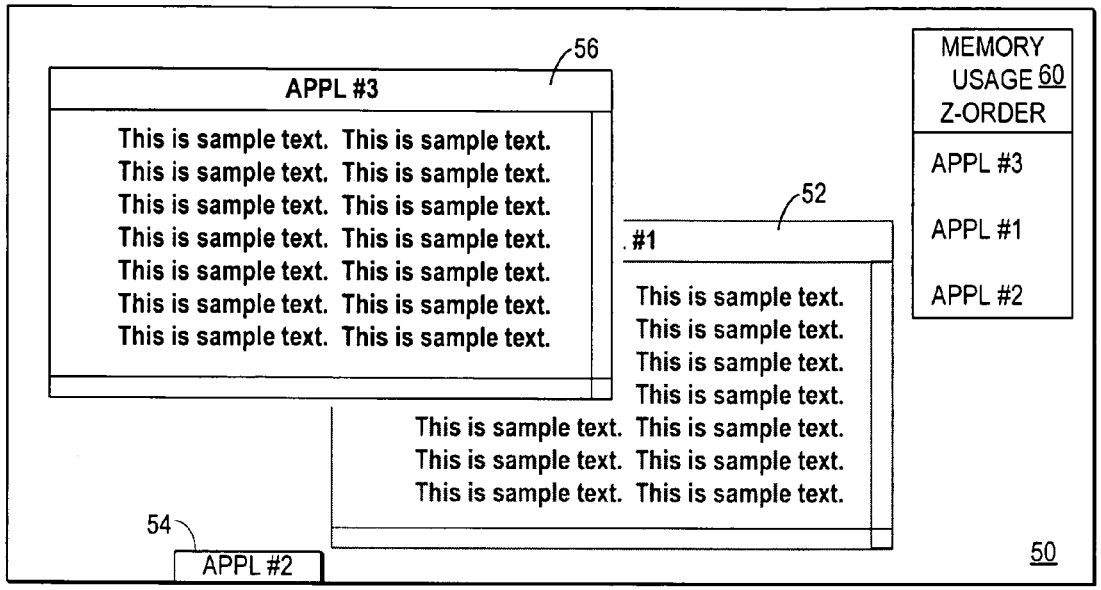
FIG. 4 illustrates a graphical representation of a user interface in which the z-ordering of windows is controlled according to memory usage in accordance with the method, system, and program of the present invention.

Referring now to FIG. 4, there is depicted a graphical representation of a user interface in which the z-ordering of windows is controlled according to memory usage in accordance with the method, system, and program of the present invention. As illustrated, window 56 is depicted at the top level of the z-order, followed by window 52 and then window 54.

According to one advantage of the present invention, windows may be z-ordered according to multiple criteria. Here, memory usage associated with each window is utilized as the z-ordering criteria, where the window utilizing the least memory is displayed at the top of the z-order. Therefore, according to the graphical display, a user may easily determine that "appl #2" is utilizing the most memory of the application windows currently active.

According to another advantage of the present invention, criteria may be designated for minimizing and maximizing window representations according to resource usage. Here, a criteria is designated to minimize the window with the greatest memory usage if the total memory usage is greater than 80% of the memory available. Therefore, the minimized representation of window 54 indicates that window 54 utilizes the greatest memory usage where the total memory usage is greater than 80% of the memory available.

In addition, a z-order chart 60 is provided as a tool for graphically designating the current criteria utilized to determine the z-order and the resulting order. Advantageously, multiple z-order charts, each utilizing independent criteria for ordering the windows, may be displayed concurrently, where upon user selection of one of the z-order charts, the windows are ordered according to that chart.

Further, levels of transparency are applied to each of the windows. Here, where window 56 is at the top of the z-order, 0% transparency is applied to the representation of window 56. However, window 52 is displayed at 40% transparency to indicate that window 52 is lower in the z-order than window 56. While the transparency applied to windows in the present example correlates with the z-order position of the windows, in alternate embodiments, the transparency of windows may be adjusted according to other criteria.

Figure 5:
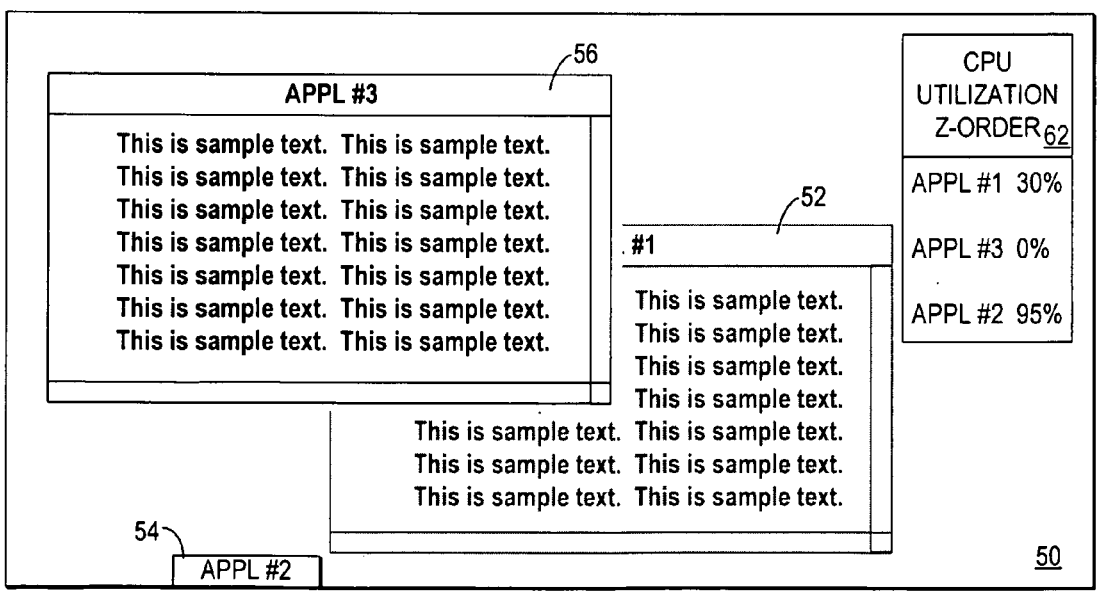
FIG. 5 depicts a graphical representation of a user interface in which transparency is applied to adjust ordering of windows in accordance with the method, system, and program of the present invention.

With reference now to FIG. 5, there is illustrated a graphical representation of a user interface in which transparency is applied to adjust ordering of windows in accordance with the method, system, and program of the present invention.

As illustrated, window 56 is assigned 0% transparency, window 52 is assigned 30% transparency and window 54 is assigned 95% transparency. According to the present example, transparency assignments are made according to recent use of windows, such that most recently used windows are the least transparent and the least recently used windows are the most transparent. However, in alternate embodiments, alternate criteria may be designated for specifying transparencies of windows. In addition, a user may selectively adjust the transparency of a single window or multiple windows.

According to one advantage of the present invention, criteria may be designated for minimizing and maximizing window representations according to transparency assignments of windows. In the example, a criteria is designated to automatically minimize windows with a transparency attribute greater than 90% transparency. Here, window 54 is assigned a transparency attribute of 95%, leading to a minimized window representation. Advantageously transparency criteria may be further distinguished according to the type of window, the information contained within a window, or the type of software controlling the window.

In addition, the windows are z-ordered according to CPU utilization. Z-order chart 62 indicates both the CPU utilization based ordering of the windows and the transparencies assigned to each window. Advantageously, through the use of z-ordering and transparency adjustment, window activity may be graphically described and distinguished.

Referring now to FIG. 6, there is depicted a table of minimization and maximization representation preferences in accordance with the method, system, and program of the present invention. As illustrated, a table 70 depicts transparency based preferences 72, resource usage preferences 74, and general usage preference 76.

Transparency based preferences 72 are first distinguished according to the type of software controlling the window. For each of the types of software controlling windows, further criteria is provided for minimizing and maximizing window representations. In addition, the criteria may be distinguished according to the type of window and the information contained within the window. Further, the criteria may be distinguished according to the criteria utilized to set the transparency for the window.

Resource usage preferences 74 are distinguished according to resource usage. In the examples, windows are minimized or maximized according to memory usage and sound card usage. In addition, resource usage may include, but is not limited to graphics card usage, number of CPUs used, total usage of each CPU, number of threads used, data storage usage and net bandwidth.

General usage preferences 76 are distinguished according to recent usage of windows. In the example, the least recently used application window is automatically minimized if the total number of windows active within the display area is greater than three windows, but less than nine windows. Then, the two least recently used applications windows are automatically minimized if the total number of windows active within the display area is nine windows or greater than nine windows. In addition, the third and fourth most recently used windows are automatically minimized, unless currently active.

In addition to designating whether to minimize or maximize a window, a user may also specify attributes of the representation that is minimized or maximized. For example, when a window is being minimized, the user may specify whether the window representation is to be a selectable icon or part of a selectable pop-up list. Further, the transparency attribute, position, and other graphical characteristics may be designated. When a window is being maximized, the user may specify the size of the open representation, the position of the open representation, the transparency and hue of the open representation, and the z-order position of the open representation.

Figure 7:
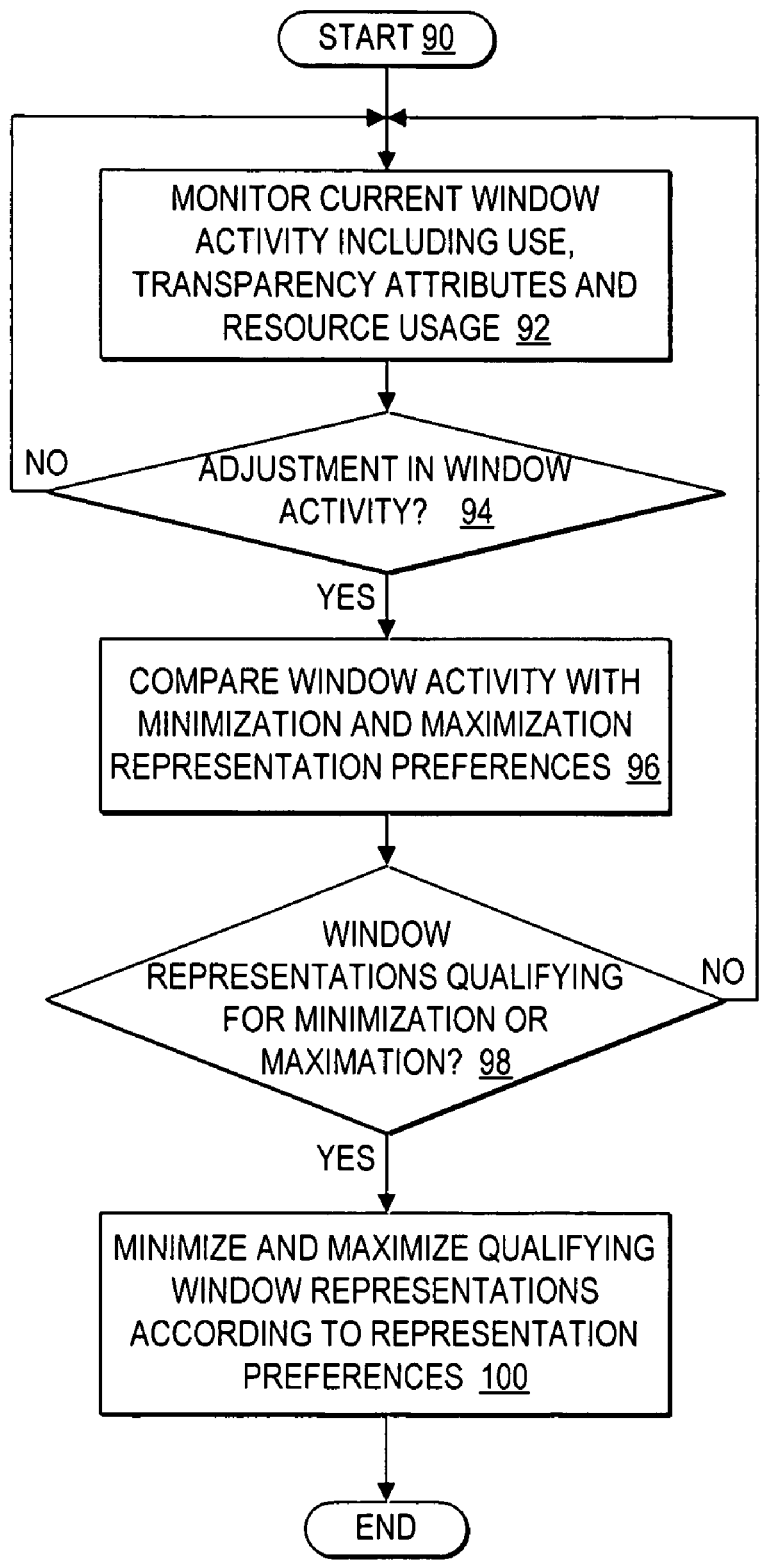
FIG. 7 depicts a high level logic flowchart of a process and program for adjusting window representations in response to window related activity in accordance with the method, system, and program of the present invention.

With reference now to FIG. 7, there is illustrated a high level logic flowchart of a process and program for adjusting window representations in response to window related activity in accordance with the method, system, and program of the present invention. As depicted, the process starts at block 90 and thereafter proceeds to block 92.

Block 92 illustrates monitoring current window activity including use, transparency attributes, and resource usage associated with windows that are currently displayed. Next, block 94 depicts a determination as to whether or not an adjustment in window activity is detected. If an adjustment in window activity is not detected, then the process passes to block 92. If an adjustment in window activity is detected, then the process passes to block 96.

Block 96 depicts comparing the window activity with the minimization and maximization representation preferences. Next, block 98 illustrates a determination as to whether or not any current window representations qualify for minimization or maximization. If no current window representations qualify for minimization of maximization, then the process returns to block 92. If a current window representation qualifies for minimization or maximization, then the process passes to block 100. Block 100 illustrates minimizing and maximizing the qualifying window representations according to representation preferences, and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for automatic window representation adjustment, said method comprising the steps of:
    detecting a separate level of current activity performed by at least one component of a computer system in association with each of a plurality of window elements within a graphical interface;
    automatically performing at least one of minimizing at least one of said plurality of window elements and maximizing at least one of said plurality of window elements as triggered by an adjustment to at least one said separate level of current activity in relation to a threshold level for said current activity, such that a representation of each of said plurality of window elements is graphically represented, wherein minimizing said window element when said separate level of current activity adjusts less than a threshold level comprises reducing said window element from a graphical window to a graphical icon representing said graphical window, wherein maximizing said window element when said separate level of current activity adjusts greater than a threshold level comprises increasing said window element from a minimized graphical icon representing said window element to a full graphical window;
    automatically adjusting a position of each of said plurality of window elements within a z-order of a plurality of windows displayed within said graphical interface to reflect said graphical representation of each of said plurality of window elements ordered according to each said separate level of current activity; and
    displaying within a separate window element within said graphical interface a graphical representation of each of said plurality of window elements ordered according to each said separate level of current activity.

2. The method for automatic window representation adjustment according to claim 1, said step of automatically performing further comprising the step of:
    automatically adjusting a size of said at least one of said plurality of window elements when performing one of minimizing at least one of said plurality of window elements and maximizing at least one of said plurality of window elements to a preselected size specified by a user in a selection of preferences designated in association with performing one of minimizing at least one of said plurality of window elements and maximizing at least one of said plurality of window elements as triggered by an adjustment to at least one said separate level of current activity in relation to said threshold level for said current activity.

3. The method for automatic window representation adjustment according to claim 1, said step of detecting a separate level of current activity further comprising the step of:
    detecting a separate level of current use of each of said plurality of window elements through user interactions with each of said plurality of window elements.

4. The method for automatic window representation adjustment according to claim 1, said step of detecting a separate level of current activity further comprising the step of:
    detecting a transparency of each separate representation of each of said plurality of window elements.

5. The method for automatic window representation adjustment according to claim 1, said method further comprising:
    detecting each said separate level of current activity in association with each of said plurality of windows elements displayed within said graphical interface; and
    adjusting a separate alpha level associated with each of said plurality of window elements to order said plurality of window elements to reflect each said separate level of said current activity.

6. The method for automatic window representation adjustment according to claim 5, said method further comprising the step of:
    adjusting a separate alpha level of a selection of said plurality of window elements that are minimized representations of a plurality of windows.

7. The method for automatic window representation adjustment according to claim 5, said method further comprising the step of:
    performing at least one of minimizing and maximizing each of said plurality of window elements in response to adjusting each said separate alpha level of each of said plurality of window elements.

8. A system for automatic window representation adjustment, said system comprising:
    a graphical user interface;
    means for detecting a separate level of current activity performed by at least one component of a computer system in association with each of a plurality of window elements within said graphical interface;
    means for automatically performing at least one of minimizing at least one of said plurality of window elements and maximizing at least one of said plurality of window elements as triggered by an adjustment to at least one said separate level of current activity in relation to a threshold level for said current activity, such that a representation of each of said plurality of window elements is graphically represented, wherein minimizing said window element when said separate level of current activity adjusts less than a threshold level comprises reducing said window element from a graphical window to a graphical icon representing said graphical window, wherein maximizing said window element when said separate level of current activity adjusts greater than a threshold level comprises increasing said window element from a minimized graphical icon representing said window element to a full graphical window;
    means for automatically adjusting a position of each of said plurality of window elements within a z-order of a plurality of windows displayed within said graphical interface to reflect said graphical representation of each of said plurality of window elements ordered according to each said separate level of current activity; and means for displaying within a separate window element within said graphical interface a graphical representation of each of said plurality of window elements ordered according to each said separate level of current activity.

9. The system for automatic window representation adjustment according to claim 8, said means for automatically performing further comprising:

means for automatically adjusting a size of said at least one of said plurality of window elements when performing one of minimizing at least one of said plurality of window elements and maximizing at least one of said plurality of window elements to a preselected size specified by a user in a selection of preferences designated in association with performing one of minimizing at least one of said plurality of window elements and maximizing at least one of said plurality of window elements as triggered by an adjustment to at least one said separate level of current activity in relation to said threshold level for said current activity.

10. The system for automatic window representation adjustment according to claim 8, said means for detecting a separate level of current activity further comprising:

means for detecting a separate level of current use of each of said plurality of window elements through user interactions with each of said plurality of window elements.

11. The system for automatic window representation adjustment according to claim 8, said means for detecting a separate level of current activity further comprising:

means for detecting a transparency of each separate representation of each of said plurality of window elements.

12. The system for automatic window representation adjustment according to claim 8, said system further comprising:

means for detecting each said separate level of current activity in association with each of said plurality of windows elements displayed within said graphical interface; and means for adjusting a separate alpha level associated with each of said plurality of window elements to order said plurality of window elements to reflect each said separate level of said current activity.

13. The system for automatic window representation adjustment according to claim 12, said system further comprising:

means for adjusting a separate alpha level of a selection of said plurality of window elements that are minimized representations of a plurality of windows.

14. The system for automatic window representation adjustment according to claim 12, said system further comprising:

means for performing at least one of minimizing and maximizing each of said plurality of window elements in response to adjusting each said separate alpha level of each of said plurality of window elements.

15. A program for automatic window representation adjustment, residing on a computer storage medium having computer readable program code means, said program comprising:

means for detecting a separate level of current activity performed by at least one component of a computer system in association with each of a plurality of window elements within a graphical interface;

means for automatically controlling performance of at least one of minimizing at least one of said plurality of window elements and maximizing at least one of said plurality of window elements as triggered by an adjustment to at least one said separate level of current activity in relation to a threshold level for said current activity, such that a representation of each of said plurality of window elements is graphically represented, wherein minimizing said window element when said separate level of current activity adjusts less than a threshold level comprises reducing said window element from a graphical window to a graphical icon representing said graphical window, wherein maximizing said window element when said separate level of current activity adjusts greater than a threshold level comprises increasing said window element from a minimized graphical icon representing said window element to a full graphical window;

means for automatically controlling adjustment of a position of each of said plurality of window elements within a z-order of a plurality of windows displayed within said graphical interface to reflect said graphical representation of each of said plurality of window elements ordered according to each said separate level of current activity; and means for controlling display within a separate window element within said graphical interface a graphical representation of each of said plurality of window elements ordered according to each said separate level of current activity.

16. The program for automatic window representation adjustment according to claim 15, said program further comprising:

means for automatically adjusting a size of said at least one of said plurality of window elements when controlling performance of one of minimizing at least one of said plurality of window elements and maximizing at least one of said plurality of window elements to a preselected size specified by a user in a selection of preferences designated in association with performing one of minimizing at least one of said plurality of window elements and maximizing at least one of said plurality of window elements as triggered by an adjustment to at least one said separate level of current activity in relation to said threshold level for said current activity.

17. The program for automatic window representation adjustment according to claim 16, said program further comprising:

means for detecting a separate level of current use of each of said plurality of window elements through user interactions with each of said plurality of window elements.

18. The program for automatic window representation adjustment according to claim 15, said program further comprising:

means for detecting a transparency of each separate representation of each of said plurality of window elements.

19. The program for automatic window representation adjustment according to claim 15, said program further comprising:

means for detecting each said separate level of current activity in association with each of said plurality of windows elements displayed within said graphical interface; and means for controlling adjustment of a separate alpha level associated with each of said plurality of window elements to order said plurality of window elements to reflect each said separate level of said current activity.

20. The program for automatic window representation adjustment according to claim 19, said program further comprising:

means for controlling adjustment of a separate alpha level of a selection of said plurality of window elements that are minimized representations of a plurality of windows.

21. The program for automatic window representation adjustment according to claim 19, said program further comprising:

means far controlling performance of at least one of minimizing and maximizing each of said plurality of window elements in response to adjusting each said separate alpha level of each of said plurality of window elements.

* * * * *